US012388838B2

(12) United States Patent
Singh et al.

(10) Patent No.: US 12,388,838 B2
(45) Date of Patent: Aug. 12, 2025

(54) DATA MANAGEMENT OPERATIONS FOR DATA FROM EDGE LOCATIONS

(71) Applicant: Dell Products L.P., Round Rock, TX (US)

(72) Inventors: Sanjay Singh, Bangalore (IN); Parminder Singh Sethi, Ludhiana (IN)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 18/115,087

(22) Filed: Feb. 28, 2023

(65) Prior Publication Data

US 2024/0291825 A1    Aug. 29, 2024

(51) Int. Cl.
*G06F 16/00*    (2019.01)
*G06F 16/28*    (2019.01)
*H04L 9/40*    (2022.01)

(52) U.S. Cl.
CPC .......... *H04L 63/107* (2013.01); *G06F 16/285* (2019.01); *H04L 63/105* (2013.01)

(58) Field of Classification Search
None
See application file for complete search history.

(56) References Cited

U.S. PATENT DOCUMENTS

| | | | | |
|---|---|---|---|---|
| 2012/0303827 A1* | 11/2012 | Neystadt | ............. | G06F 21/6218 709/229 |
| 2018/0089328 A1* | 3/2018 | Bath | ..................... | G06F 16/901 |
| 2023/0199561 A1* | 6/2023 | Lekutai | ............. | H04W 28/0967 370/235 |

OTHER PUBLICATIONS

Wikipedia, "IPoE," https://en.wikipedia.org/wiki/IPoE#:~:text=Internet, Oct. 14, 2021, 1 page.
Wikipedia, "5G Network Slicing," https://en.wikipedia.org/wiki/5G_network_slicing, Feb. 16, 2022, 7 pages.
Dell Technologies, "Dell EMC SupportAssist Enterprise 2.x—Guide and Download," https://www.dell.com/support/kbdoc/en-US/000179530/dell-emc-supportassist-enterprise-2-x-guide-and-download, Article No. 000179530, Accessed Mar. 21, 2022, 10 pages.
Wikipedia, "High Availability," https://en.wikipedia.org/wiki/High_availability#, Feb. 28, 2022, 8 pages.
Gokhankosem, "IP over Ethernet and OPOE versus PPPOE," https://ipcisco.com/ip-over-ethernet-and-ipoe-versus-pppoe/, Oct. 28, 2020, 16 pages.

(Continued)

*Primary Examiner* — Anhtai V Tran
(74) *Attorney, Agent, or Firm* — Ryan, Mason & Lewis, LLP

(57) ABSTRACT

A method comprises receiving data from a plurality of devices and analyzing the data to identify one or more parameters for segregation of the data. In the method, the data is tagged with one or more metadata tags corresponding to the one or more parameters. The method further comprises segregating the data into a plurality of data portions based at least in part on the one or more parameters, and storing respective ones of the plurality of data portions in respective data stores of a plurality of data stores. The one or more parameters comprise at least one of one or more policies corresponding to the data and respective locations of the plurality of devices.

20 Claims, 8 Drawing Sheets

(56) References Cited

OTHER PUBLICATIONS

Faction, "What is Data Gravity? How it Can Influence Your Cloud Strategy," https://www.factioninc.com/blog/data-gravity-as-the-center-of-your-multi-cloud-universe/, Nov. 20, 2021, 11 pages.
T. Tovinger, "Management, Orchestration and Charging for 5G networks." https://www.3gpp.org/news-events/1951-sa5_5g, Mar. 22, 2018, 8 pages.
Alienor, "The Network Layers Explained [with examples]" https://www.plixer.com/blog/network-layers-explained/, Nov. 28, 2018, 18 pages.
A. O'keeffe, "The Difference Between Layer 3 and Layer 2 Networks," https://www.aussiebroadband.com.au/blog/difference-layer-3-layer-2-networks/, Oct. 20, 2018, 15 pages.
S. Zaharoff, "What is Brownfield (brownfield deployment, brownfield site)?" https://www.techtarget.com/searchdatacenter/definition/brownfield-site, Jun. 2015, 3 pages.
U.S. Appl. No. 17/714,595 filed in the name of Parminder Singh Sethi et al. on Apr. 6, 2022, and entitled "Network Orchestration for Device Management Operations.".

\* cited by examiner

300

| POLICY | DEVICE ID | FUNCTIONAL GROUP | ROLE |
|---|---|---|---|
| HIGH BANDWIDTH | A, C | VIDEO STREAMING | VIDEO ADMINISTRATION |
| LOW LATENCY | B, D | SECURE BANKING | BANKING ANALYSIS |

FIG. 3

| FUNCTIONAL GROUP | LOCATION | TENANT NAME/ROLE | REPORT GENERATED |
|---|---|---|---|
| VIDEO STREAMING | REGION I DATA STORE | BILLING MANAGER/DATA STORE FINANCIALS | CLIENT A, BILL FOR REGION I; CLIENT B, BILL FOR REGION I |
| VIDEO STREAMING | REGION II DATA STORE | BILLING MANAGER/DATA STORE FINANCIALS | CLIENT A, BILL FOR REGION II; CLIENT B, BILL FOR REGION II |

| POLICY | 5G SLICE | DEVICE ID | FUNCTIONAL GROUP | DATA STORE |
|---|---|---|---|---|
| HIGH BANDWIDTH | eMBB | A | VIDEO STREAMING | REGION I |
| LOW LATENCY | URLLC | B | SECURE BANKING | REGION II |

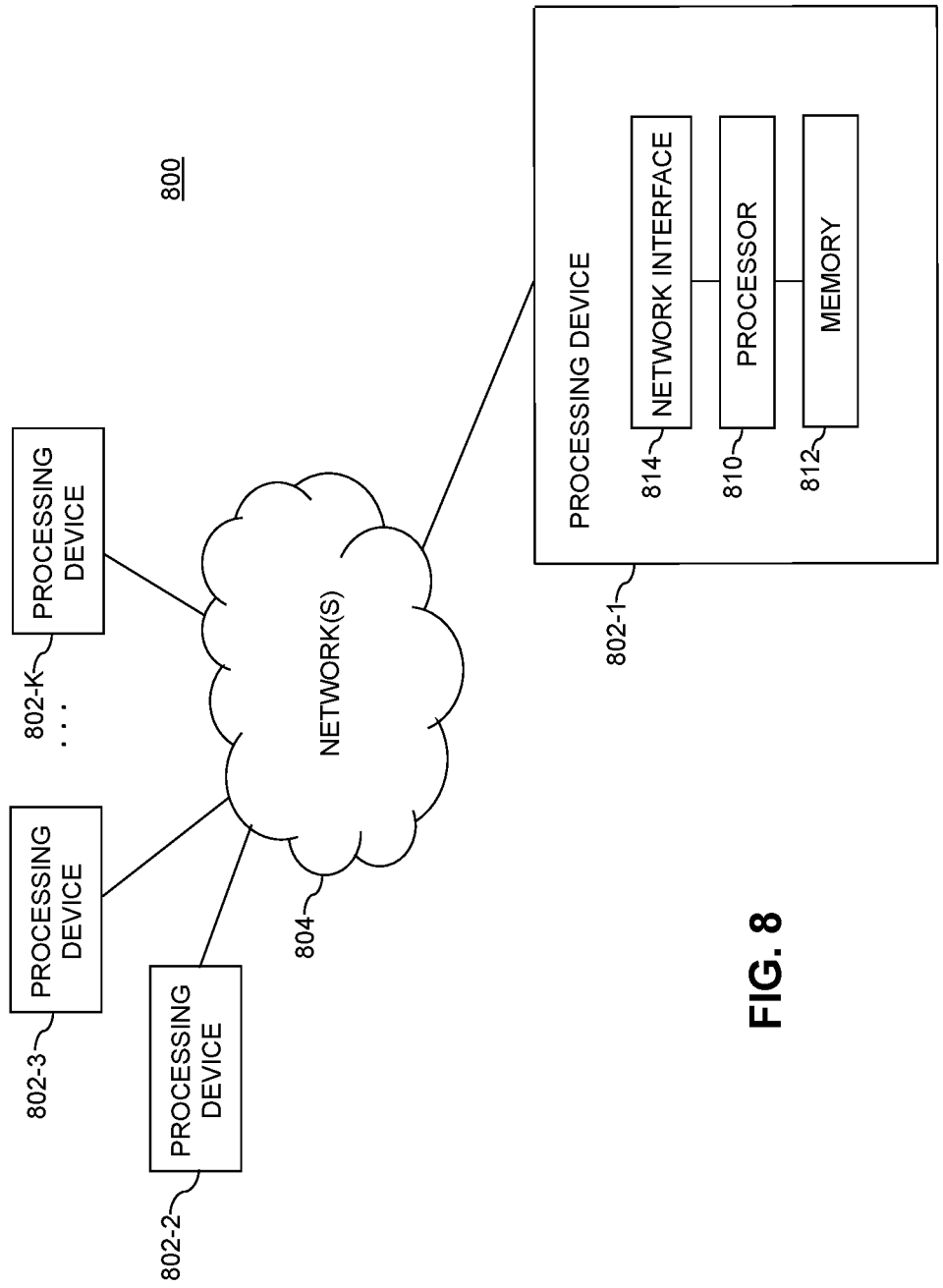

DATA MANAGEMENT OPERATIONS FOR DATA FROM EDGE LOCATIONS

FIELD

The field relates generally to information processing systems, and more particularly to data management in such information processing systems.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. Edge computing architectures of this type can help to conserve network bandwidth, while also reducing latency and congestion, thus improving overall system performance.

It is estimated that the amount of data being processed at edge locations will increase in upcoming years. With more data being processed at edge locations, the data will be stored in a distributed fashion, making it more difficult to access the data. Such difficulties are magnified in the case of device operational data, which may need to be accessed within strict timelines and with certain levels of security in order to address device issues in a timely and secure manner.

SUMMARY

Embodiments provide a data management platform in an information processing system.

For example, in one embodiment, a method comprises receiving data from a plurality of devices and analyzing the data to identify one or more parameters for segregation of the data. In the method, the data is tagged with one or more metadata tags corresponding to the one or more parameters. The method further comprises segregating the data into a plurality of data portions based at least in part on the one or more parameters, and storing respective ones of the plurality of data portions in respective data stores of a plurality of data stores. The one or more parameters comprise at least one of one or more policies corresponding to the data and respective locations of the plurality of devices.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a table illustrating data segregation based on different data requirements in an illustrative embodiment.

FIG. 4 depicts a table illustrating regional data aggregation in an illustrative embodiment.

FIG. 5 depicts a table illustrating data mapping to different communication networks in an illustrative embodiment.

FIGS. 7 and 8 show examples of processing platforms that may be utilized to implement at least a portion of an information processing system according to illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
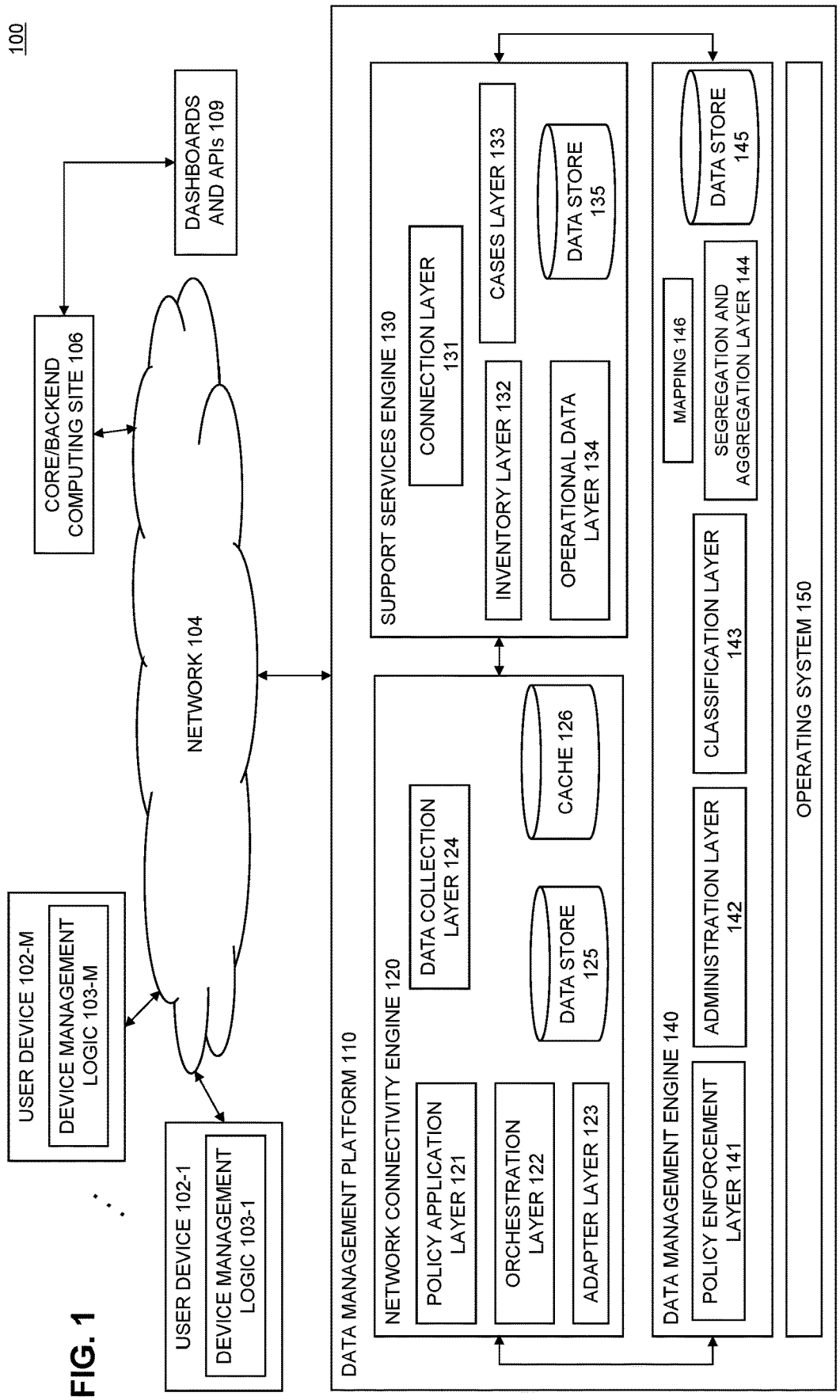
FIG. 1 depicts an information processing system with a data management platform for controlling data access from edge locations in an illustrative embodiment.

FIG. 1 shows an information processing system 100 configured in accordance with an illustrative embodiment. The information processing system 100 comprises user devices 102-1, . . . 102-M (collectively "user devices 102") including respective instances of device management logic 103-1, . . . 103-M (collectively "device management logic 103"). The information processing system 100 further comprises at least one core/backend computing site 106 and dashboards and application programming interfaces (APIs) 109 corresponding to the at least one core/backend computing site 106. The user devices 102 communicate over the network 104 (which may comprise multiple networks) with a data management platform 110, and with a core/backend computing site 106. The variable M and other similar index variables herein such as K, L and P are assumed to be arbitrary positive integers greater than or equal to one.

The user devices 102 can comprise, for example, desktop, laptop or tablet computers, servers, host devices, storage devices, switches, mobile telephones, Internet of Things (IoT) devices or other types of processing devices capable of communicating with the data management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. At least a portion of the available services and functionalities provided by the data management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the data management platform 110, as well as to support communication between the data management platform 110, connected devices (e.g., user devices 102), connected sites (e.g., core/backend computing sites 106) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the data management platform 110.

Figure 2:
FIGS. 2A and 2B respectively depict edge and core/backend computing sites in an illustrative embodiment.

In some embodiments, the user devices 102 may be part of an edge computing site as "edge devices." An edge computing site comprises one or more edge stations or other types and arrangements of edge nodes illustratively comprising a plurality of edge devices. Referring for example to FIG. 2A, an example edge computing site 205 comprises a set of edge compute, storage and/or network resources 207. A given such set of edge resources illustratively comprises at least one of compute, storage and network resources of one or more edge devices of the corresponding edge computing site.

Referring to FIG. 2B, an example core/backend computing site 206 (which may be the same or similar to core/backend computing site 106) comprises a set of core compute, storage and/or network resources 208. The core/backend computing site 106/206 comprises one or more data centers or other types and arrangements of core/backend nodes. The core/backend computing site 106/206 illustratively comprises at least one data center implemented at least in part utilizing cloud infrastructure. Each such node of an edge computing site 205, backend/core computing site 106/206 or other computing site comprises at least one processing device that includes a processor coupled to a memory.

The edge computing site 205 and the core/backend computing site 106/206 illustratively execute at least portions of various workloads for system users. Such workloads may comprise one or more applications. As used herein, the term "application" is intended to be broadly construed to encompass, for example, microservices and other types of services implemented in software executed by the sites 205 or 106/206. Such applications can include edge-hosted applications running on the edge computing site 205 and core/backend-hosted applications running on the core/backend computing site 106/206.

Edge and core compute resources of the edge and core/backend computing sites 205 and 106/206 can include, for example, various arrangements of processors, possibly including associated accelerators. Edge and core storage resources of the edge and core/backend computing sites 205 and 106/206 can include, for example, one or more storage systems or portions thereof that are part of or otherwise associated with the edge and core/backend computing sites 205 and 106/206. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge and core network resources of the edge and core/backend computing sites 205 and 106/206 can include, for example, resources of various types of network interface devices providing particular bandwidth, data rate and communication protocol features.

An edge computing site 205 comprises a plurality of edge devices, with a given such edge device (e.g., user device 102) comprising a processing device that includes a processor coupled to a memory. One or more core/backend computing sites 106/206 may comprise, for example, at least one data center implemented at least in part utilizing cloud infrastructure. It is to be appreciated, however, that illustrative embodiments disclosed herein do not require the use of cloud infrastructure. The one or more edge and core/backend computing sites 205 and 106/206 are each assumed to be implemented using at least one processing device of at least one processing platform. Each such processing device generally comprises at least one processor and an associated memory, and implements at least a portion of the functionality of the edge and core compute, storage and/or network resources. Such processing devices can illustratively include particular arrangements of compute, storage and network resources.

As noted herein above, with more data being processed at edge locations, the data will be stored in a distributed fashion, making it more difficult to access the data. Illustrative embodiments provide techniques to address the difficulties in accessing data from edge locations. For example, the embodiments provide a framework which segregates data (e.g., operational data) based on one or more parameters so that critical and important data can be accessed and processed more quickly than other types of data. Advantageously, the embodiments provide technical solutions to segregate the data in secure logical data stores and to aggregate and correlate the data in response incoming queries.

The data management platform 110 in the present embodiment is assumed to be accessible to the user devices 102, core/backend computing site 106 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network such as, for example, fourth generation (4G) (e.g., 4G LTE) or fifth generation (5G) (e.g., 5G stand-alone (5G SA), 5G non-stand-alone (5G NSA)), a private network (e.g., Private Long-Term Evolution (pLTE)), a wireless network such as a WiFi or WiMAX network, or various portions or combinations of these and other types of networks. As explained in more detail herein, the network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the data management platform 110 includes a network connectivity engine 120, a support services engine 130 and a data management engine 140. The data management platform 110 runs on an underlying operating system (OS) 150 such as, for example, a Windows® or Linux® OS. The network connectivity engine 120 includes a policy application layer 121, an orchestration layer 122, an adapter layer 123, a data collection layer 124, a data store 125 and a cache 126. The support services engine 130 includes a connection layer 131, an inventory layer 132, a cases layer 133, an operational data layer 134 and a data store 135. The data management engine 140 includes a policy enforcement layer 141, an administration layer 142, a classification layer 143, a segregation and aggregation layer 144, a data store 145 and a mapping layer 146. In some embodiments, the data management platform 110 or a portion thereof is an element of an edge computing site 205. Additionally, although one data management platform 110 is shown, there may be multiple data management platforms 110 that may be elements of respective edge computing sites 205.

The instances of device management logic 103 in the user devices 102 can be configured to collect data from the user devices 102. In illustrative embodiments, the data collected includes operational data comprising information identifying the user devices 102 and the components of the user devices 102, information corresponding to alerts about the health and operational status of the components of the user devices 102, information corresponding to applications running on the user devices 102 and information corresponding to workloads from the user devices 102 that need to be processed by edge and/or core/backend computing sites 205 and 106/206. As used herein, a "component" is to be broadly construed, and can refer to various parts, hardware components and/or software components such as, but not necessarily limited to, storage devices (e.g., hard disk drives), batteries, chassis, display panels, motherboards, central processing units (CPUs), controllers, cards, heat sinks, fans, fan assemblies, processors, ports, port connectors, host bus adaptors (HBAs), speakers, keyboards, memories, servers, switches, sensors, buses (e.g., serial buses) or other elements of a user device 102.

In an illustrative embodiment, the data collected by the instances of device management logic 103 is received and/or retrieved by the data management platform 110 via the connection layer 131 of the support services engine 130 and provided to the data collection layer 124 of the network connectivity engine 120 and to the administration layer 142 of the data management engine 140. In illustrative embodiments, the data received and/or retrieved via the connection layer 131 is sent to the inventory layer 132, which classifies the data based on origin (e.g., user device 102, component, application, etc.), and sends the classified data to the data collection layer 124. The data received by the data collection layer 124 is stored in at least one data store 125.

The data received and/or retrieved by the data management platform 110 is received over, for example, a first network, such as a wired and/or wireless (e.g., WiFi or WiMAX) network. In illustrative embodiments, the policy enforcement layer 141 of the data management engine 140 analyzes the data (e.g., operational data) to identify one or more parameters for segregation of the data. The one or more parameters comprise, for example, one or more policies corresponding to the data and/or respective locations of the plurality of devices. For example, the one or more policies specify one or more data transmission requirements such as, but not necessarily limited to, latency, bandwidth, security and/or data gravity. For example, some of the applications running on the user devices 102 may specify certain data transmission requirements such as, but not necessarily limited to, high bandwidth and low latency, a secure network and low bandwidth, etc. In some cases, an application may not specify or require one or more of the parameters. Such requirements and/or specifications may be identified, for example, in metadata associated with an application, in commands or instructions associated with an application, in application code, and/or in service level agreements (SLAs) accessible to the policy enforcement layer 141. The SLAs may be associated with a user device 102 and/or application.

In illustrative embodiments, a charging function, which may be part of the policy enforcement layer 141, defines critical values by assigning weights to input variables such as, for example, required latency, bandwidth, security, data gravity, etc. For example, some parameters may be assigned higher weights based on whether those parameters are more crucial to the processing of an application workload than other parameters. For example, in the case of video processing applications, high bandwidth may be weighted higher than other factors, in the case of applications transmitting sensitive information, network security may be weighted higher than other factors and in the case intrusion detection applications, low latency may be weighted higher than other applications.

The locations of the plurality of devices correspond to IP geolocations. In more detail, the IP address of a given device (e.g., one of the user devices 102) is recorded by the data collection layer 124, and the geographic location of the given device is identified based on the IP address. The policy enforcement layer 141 comprises, for example, a geolocation API, which is used to identify the geographic locations.

The classification layer 143 of the data management engine 140 tags the data with one or more metadata tags corresponding to the one or more parameters that have been identified by the policy enforcement layer 141. In addition, the classification layer 143 classifies the data into one or more functional groups. Each functional group corresponds to, for example, commonly defined actions that can be performed by the functional group. Some non-limiting examples of functional groups are "video streaming," "secure banking," "intrusion detection," etc.

The segregation and aggregation layer 144 segregates the data into a plurality of data portions based at least in part on the one or more parameters and/or the one or more functional groups. The segregated data portions are stored in respective data stores based on how the data portions have been segregated.

In a non-limiting operational example, referring to the table 300 in FIG. 3, operational data from four devices A, B, C and D (e.g., user devices 102) is received by the data management platform 110, and the policy enforcement layer 141 identifies two policies: "high bandwidth" and "low latency" from the data. In this case, devices A and C require high bandwidth, and devices B and D require low latency. The policy enforcement layer 141 determines that device A and C are in region I, and devices B and D are in region II. The segregation and aggregation layer 144 segregates the operational data based on policy at each region. In this example, a data store in region I stores data from devices A and C, and a data store in region II stores data from devices B and D. The data store 145, which may be part of an edge computing site (e.g., edge computing site 205) may be one of the data stores used for storing segregated data. Alternatively, one or more data stores in edge computing sites corresponding to region I and/or region II can be used to store the segregated data.

In addition, the classification layer 143 classifies the data corresponding to devices A and C in the video streaming functional group, and the data corresponding to devices B and D in the secure banking functional group. The classification layer 143 tags with, for example, geo location metadata (region I or II), policy type metadata and functional group metadata. For example, data from devices A and C includes "high bandwidth," "region I" and "video streaming" tags, and data from devices B and D includes "low latency," "region II" and "secure banking" tags. Certain data stores may be limited to data corresponding to a designated policy (e.g., high bandwidth or low latency), a given location (e.g., region I or II) and/or a particular functional group (e.g., video streaming or secure banking).

The policy enforcement layer 141 further assigns access to users to respective ones of the data portions based at least in part on roles of the users. For example, referring to the table 300, users with a video administration role are provided with access to data portions corresponding to devices A and C and high bandwidth in the video streaming functional group, and not to data portions corresponding to devices B and D. Users with a banking analysis role are provided with access to data portions corresponding to devices B and D and low latency in the secure banking functional group, and not to data portions corresponding to device A and C.

Although data may be segregated, the illustrative embodiments provide techniques to allow for aggregated data monitoring and operations across distributed data stores. For example, the segregation and aggregation layer 144 aggregates segregated data from distributed data stores in different edge locations based on, for example, common parameters and/or user access rights. In a non-limiting illustrative embodiment, the segregation and aggregation layer 144 performs logical aggregation of data from multiple edge locations based on the data falling under the same policies and/or access rights of users. The data is tagged based on, for example, policies allowing access and limiting user operations.

For example, referring to the table 400 in FIG. 4, video streaming data can be aggregated across two regions for billing. Through aggregation, multiple data stores in different edge locations (region I and II) whose data fall under the same functional group (video streaming) are accessible to tenants with access to this functional group and the particular regions. In this case users who are billing managers with a data store financials role are given access to data from both regions I and II so that reports for clients A and B can be generated. The reports include a client A bill for region I, a client B bill for region I, a client A bill for region II, and a client B bill for region II.

As can be understood, the segregation and aggregation layer 144 aggregates data portions from respective data stores based at least in part on one or more common parameters, and the policy enforcement layer 141 enables access by at least one user to the aggregated data portions. In illustrative embodiments, the aggregating is an automated response to one or more queries for the data from users with access rights to the data. In some embodiments, a core/backend computing site 106 via the dashboards and APIs 109, generates a visualization of the aggregated data portions from respective data stores in different edge locations. The aggregated data portions may be received by the core/backend computing site 106 from the respective data stores in a plurality of data streams. The APIs correlate multiple data streams of, for example, operational data, to deliver real-time insights in an integrated dashboard. In illustrative embodiments, the aggregating of the data portions is based at least in part on the assigned access of users to the data portions, which as noted herein, may be based at least in part on a role of each user.

In illustrative embodiments, the mapping layer 146 of the of the data management engine 140 maps segregated data portions to one or more network slices through which the data of the data portions can be transmitted from data stores at different edge locations to the core/backend computing site 106. An example data store from which transmission may occur is data store 145, and an example edge location is edge computing site 205. The network slices may be of 4G network, a 5G network and/or a pLTE network. The network slices are determined based at least in part on one or more parameters (e.g., high bandwidth, low latency, etc.).

In illustrative embodiments, the policy application layer 121 in conjunction with the mapping layer 146 analyzes the data portions to identify one or more conditions for transmission of the data portions to the core/backend computing site 106. The one or more conditions for transmission of the data comprise, but are not necessarily limited to latency, bandwidth, security and/or data gravity. Based, at least in part, on the one or more conditions, the policy application layer 121 and the mapping layer determine a network to be utilized for transmission of the data to the core/backend computing site 106. The orchestration layer 122 and administration layer 142 in conjunction with the policy application layer 121 and mapping layer 146 assign the data portions to a particular network and/or a particular portion of a network (e.g., network slice). As used herein, "network slices" or "network slicing" is to be broadly construed to refer to, for example, a network architecture enabling multiplexing of virtualized and independent logical networks on the same physical network infrastructure. A network slice may be an isolated end-to-end network tailored to fulfill the requirements of a given application. Some non-limiting examples of network slices include, for example, an ultra-reliable low latency connection (URLLC) network slice, an enhanced mobile broadband (eMBB) network slice and a massive machine-to-machine type communication (mMTC) network slice, which may correspond to IoT traffic. For example, augmented reality video traffic may require both eMBB (high bandwidth) and URLLC (low latency) characteristics.

The mapping layer 146 logically maps data portions onto domains based on, for example, policies. The data portions may be tagged and classified based on policies to form logical separate domains extending from edge to backend locations. When connected over a designated communication network, data policies are enforced to map the connection over the right network slice to meet data requirements. The appropriate mapping also allows for SLA requirements of the data and user to be met.

For example, referring to the table 500 in FIG. 5, video streaming and secure banking data can be mapped to meet end user requirements of high bandwidth and low latency. For example, the high bandwidth policy is mapped to an eMBB network slice, and the low latency policy is mapped to a URLLC network slice. Device A, which is from the video streaming functional group, corresponds to the high bandwidth policy. Data from device A is transmitted via the eMBB network slice to the core/backend computing site 106 via a 5G core from region I. Device B, which is from the secure banking functional group, corresponds to the low latency policy. Data from device B is transmitted via the URLLC network slice to the core/backend computing site 106 via a 5G core from region II. The region I data store is located closer to device A than device B and is distinct from the region II data store, which is located closer to device B than device A. Data portions that are queued for transmission may be stored in cache 126 before being transmitted over a selected network or network slice.

Referring back to FIG. 1, user devices 102 send data to the support services engine 130 via the connection layer 131. The data is sent to an inventory layer 132 to classify the data, for example, based on origin. A cases layer 133 processes and aggregates the data to be utilized for support services and/or technical support cases. The operational data layer 134 filters the aggregated data for operational details, and the filtered data is stored in a data store 135 for future consumption by, for example a core/backend computing site 106 of an enterprise managing the user devices 102.

The adapter layer 123 of the network connectivity engine 120 and the administration layer 142 of the data management engine 140 are utilized for communication and protocol integration. For example, the adapter layer 123 communicates with the connection layer 131 of the support services engine 130 to allow the support services engine 130 to interoperate with the user devices 102 regardless of their corresponding connectivity protocols. For example, a driver in the adapter layer 123 translates a variety of connectivity protocols associated with, for example, 4G and/or 5G networks, to a connectivity protocol used for broadband connections such as, but not necessarily limited to Internet Protocol over Ethernet (IPoE) or point-to-point over Ethernet (PPPoE) protocols.

In addition, once a network or network slice has been selected based on one or more of the requirements discussed herein above, the adapter layer 123 and the administration layer 142 configure data for transmission over a selected network or network slice. For example, the adapter layer 123 and the administration layer 142 identify one or more connectivity protocol types in one or more packet fields of the data, and execute one or more interfaces for parsing the data to conform with the one or more connectivity protocols used by the selected network or network slice so that the data can be sent to edge and/or core/backend computing sites 205 and 106/206 over the selected network or network slice. Data may be stored in cache 126 before being transmitted over the selected network or network slice.

The embodiments discussed herein may be used in connection with user devices 102 operating over a 5G network and requiring quick interpretation and action on the data. Such user devices 102 may be used in connection with, for example, robotics in manufacturing scenarios to enhance cognitive quality and distributed processing of data closer to or at edge locations. In another non-limiting example, the illustrative embodiments may be used in connection with securing access to sensitive information such as, for example, personal General Data Protection Regulation (GDPR) data and salary information, which may require authorized users and users in certain geographical areas to access the information.

According to one or more embodiments, the data stores 125, 135 and 145, cache 126 and other data stores, repositories or databases referred to herein can be configured according to a relational database management system (RDBMS) (e.g., PostgreSQL). In some embodiments, the data stores 125, 135 and 145, cache 126 and other data stores, repositories or databases referred to herein are implemented using one or more storage systems or devices associated with the data management platform 110. In some embodiments, one or more of the storage systems utilized to implement the data stores 125, 135 and 145, cache 126 and other data stores, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the data management platform 110, the network connectivity engine 120, support services engine 130 and/or data management engine 140 in other embodiments can be implemented at least in part externally to the data management platform 110, for example, as stand-alone servers, sets of servers or other types of systems coupled to the network 104. For example, the network connectivity engine 120, support services engine 130 and/or data management engine 140 may be provided as cloud services accessible by the data management platform 110.

The network connectivity engine 120, support services engine 130 and/or data management engine 140 in the FIG.

1 embodiment are each assumed to be implemented using at least one processing device. Each such processing device generally comprises at least one processor and an associated memory, and implements one or more functional modules for controlling certain features of the network connectivity engine 120, support services engine 130 and/or data management engine 140.

At least portions of the data management platform 110 and the elements thereof may be implemented at least in part in the form of software that is stored in memory and executed by a processor. The data management platform 110 and the elements thereof comprise further hardware and software required for running the data management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the network connectivity engine 120, support services engine 130, data management engine 140 and other elements of the data management platform 110 in the present embodiment are shown as part of the data management platform 110, at least a portion of the network connectivity engine 120, support services engine 130, data management engine 140 and other elements of the data management platform 110 in other embodiments may be implemented on one or more other processing platforms that are accessible to the data management platform 110 over one or more networks. Such elements can each be implemented at least in part within another system element or at least in part utilizing one or more stand-alone elements coupled to the network 104.

It is assumed that the data management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the network connectivity engine 120, support services engine 130, data management engine 140 and other elements of the data management platform 110, and the elements thereof can each be implemented in the form of one or more LXCs running on one or more VMs. Other arrangements of one or more processing devices of a processing platform can be used to implement the network connectivity engine 120, support services engine 130 and data management engine 140, as well as other elements of the data management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the data management platform 110 to reside in different data centers. Numerous other distributed implementations of the data management platform 110 are possible.

Accordingly, one or each of the network connectivity engine 120, support services engine 130, data management engine 140 and other elements of the data management platform 110 can each be implemented in a distributed manner so as to comprise a plurality of distributed elements implemented on respective ones of a plurality of compute nodes of the data management platform 110.

It is to be appreciated that these and other features of illustrative embodiments are presented by way of example only, and should not be construed as limiting in any way. Accordingly, different numbers, types and arrangements of system elements such as the network connectivity engine 120, support services engine 130, data management engine 140 and other elements of the data management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the data management platform can be offered to cloud infrastructure customers or other users as part of FaaS, CaaS and/or PaaS offerings.

Figure 6:
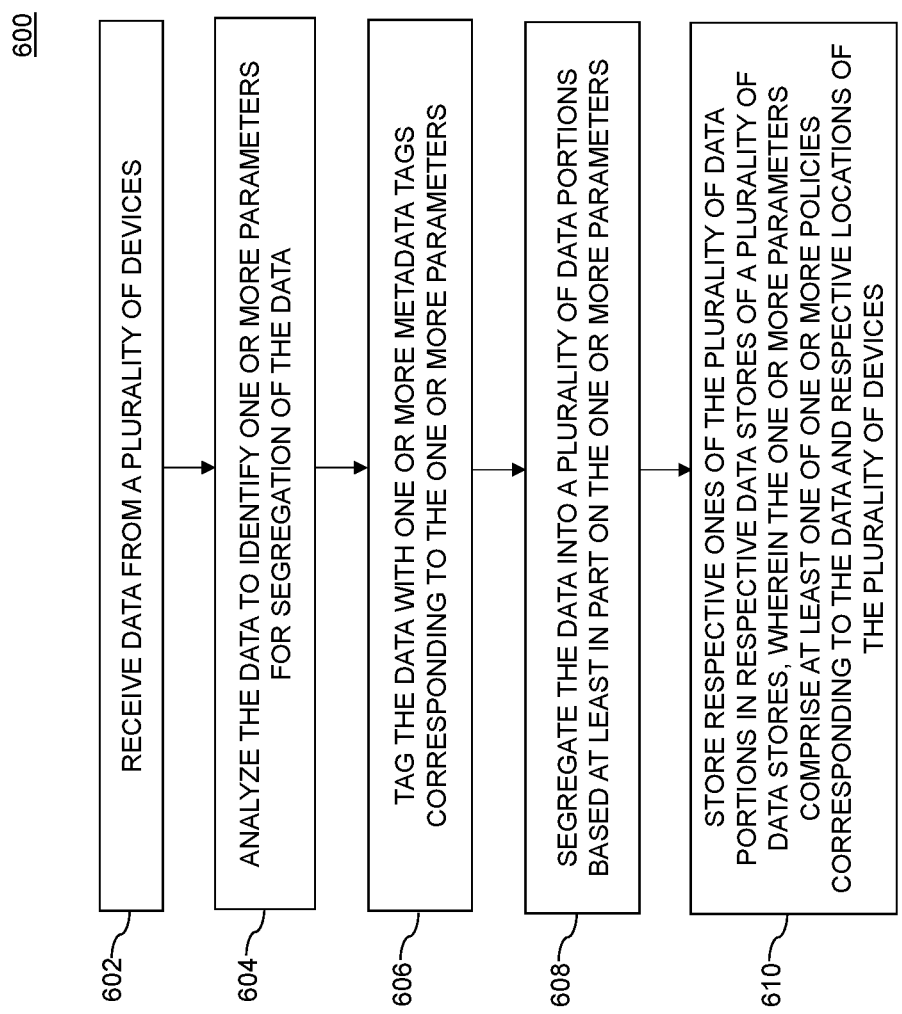
FIG. 6 depicts a process for controlling data access from edge locations according to an illustrative embodiment.

The operation of the information processing system 100 will now be described in further detail with reference to the flow diagram of FIG. 6. With reference to FIG. 6, a process 600 for controlling data access from edge locations as shown includes steps 602 through 610, and is suitable for use in the system 100 but is more generally applicable to other types of information processing systems comprising a data management platform configured for controlling data access from edge locations.

In step 602, data is received from a plurality of devices. In illustrative embodiments, the data comprises operational data of the plurality of devices. In step 604, the data is analyzed to identify one or more parameters for segregation of the data. The one or more parameters comprise, for example, one or more policies corresponding to the data and/or respective locations of the plurality of devices.

In step 606, the data is tagged with one or more metadata tags corresponding to the one or more parameters. In step 608, the data is segregated into a plurality of data portions based at least in part on the one or more parameters. In step 610, respective ones of the plurality of data portions are stored in respective data stores of a plurality of data stores. At least a subset of the respective data stores are in respective edge locations corresponding to the plurality of devices.

In illustrative embodiments, the plurality of data portions are mapped to one or more network slices of a 5G network and/or a pLTE network based at least in part on the one or more policies. The one or more policies specify, for example, one or more data transmission requirements comprising, for example, latency, bandwidth, security and/or data gravity. The one or more network slices comprise, for example, a URLLC network slice and/or an eMBB network slice.

In one or more embodiments, at least some of the respective ones of the plurality of data portions from the respective data stores are aggregated based at least in part on one or more common parameters of the one or more parameters. Access by at least one user to the aggregated ones of the plurality of data portions from the respective data stores is enabled. The aggregating may be performed in response to one or more queries for the data. In some embodiments, a visualization of the aggregated ones of the plurality of data portions is generated, wherein the aggregated ones of the plurality of data portions are received from the respective data stores in a plurality of data streams.

In accordance with illustrative embodiments, access to at least one user to at least some of the respective ones of the plurality of data portions from the respective data stores is assigned based at least in part on a role of the at least one user. At least some of the respective ones of the plurality of data portions from the respective data stores are aggregated based at least in part on the assigned access.

The process may also comprise classifying the data into one or more functional groups, and segregating the data into the plurality of data portions based at least in part on the one or more functional groups.

It is to be appreciated that the FIG. 6 process and other features and functionality described above can be adapted for use with other types of information systems configured to execute data access services in a data management platform or other type of platform.

The particular processing operations and other system functionality described in conjunction with the flow diagram of FIG. 6 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a data management platform as disclosed herein can provide a number of significant advantages relative to conventional arrangements. For example, the data management platform effectively provides a framework for dividing data into different sets based on one or more parameters, such as policies and geographic locations of devices. This segregation of data advantageously allows for granular control of operations by various entities on data sets and their contents. The management and organization of the data according to the illustrative embodiments facilitates access to the data so that the data can be processed at the edge of a network. The processing of the data at edge locations results in reduced data movement and cost, higher data security and increased data sovereignty. The embodiments further facilitate compliance with local laws for data gravity and reporting.

As an additional advantage, the embodiments further provide for secure access to various data sets based on defined policies. The classification of various data sets into functional groups further facilitates the division of data and how and by whom it is accessed. For example, various users are classified into the functional groups, with each functional group having certain rights to access, modify and/or retrieve the data. Thus, the operational data sets can be secured based on policies defined for each user.

The embodiments also provide technical solutions to map data from edge locations to core/backend computing sites over network slices based on the policies identified during data segregation. Such policies correspond to how the data is to be transmitted so as to be compliant with enterprise and user requirements and agreements governing factors like security, bandwidth and latency. The embodiments are scalable to keep pace with the increasing number of devices and processing at edge locations, and provide real-time data and corresponding insights to users at core/backend computing sites that need to access this data from distributed data stores at edge locations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the data management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data management platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
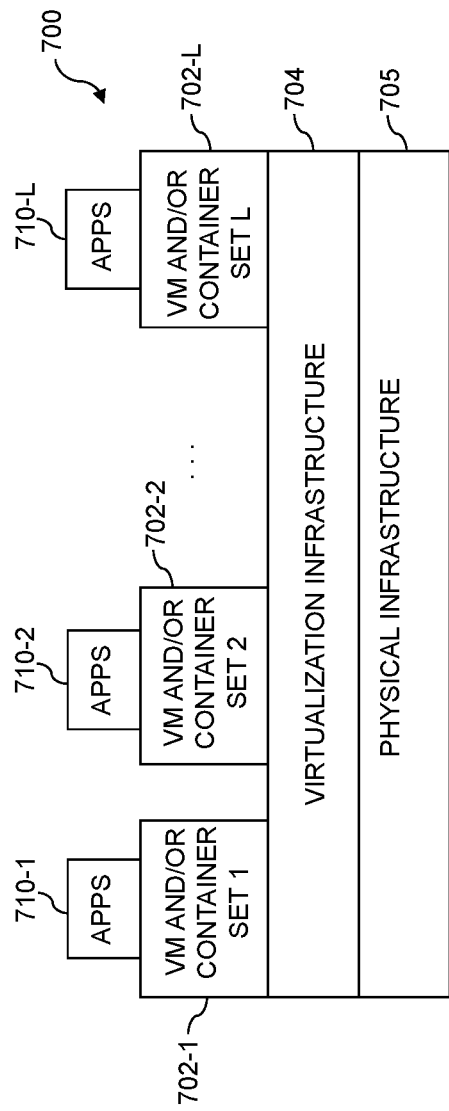

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the data management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and data management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving data from a plurality of devices;
analyzing the data to identify one or more parameters for segregation of the data;
tagging the data with one or more metadata tags corresponding to the one or more parameters;
segregating the data into a plurality of data portions based at least in part on the one or more parameters; and
storing respective ones of the plurality of data portions in respective data stores of a plurality of data stores;
wherein the one or more parameters comprise at least one of one or more policies corresponding to the data and respective locations of the plurality of devices;
wherein the steps of the method are executed by a processing device operatively coupled to a memory.

2. The method of claim 1 further comprising mapping the plurality of data portions to one or more network slices of at least one of a fifth generation (5G) network and a private long-term evolution (pLTE) network based at least in part on the one or more policies.

3. The method of claim 2 wherein the one or more policies specify one or more data transmission requirements.

4. The method of claim 3 wherein the one or more data transmission requirements comprise at least one of latency, bandwidth, security and data gravity.

5. The method of claim 2 wherein the one or more network slices comprise at least one of an ultra-reliable low latency connection (URLLC) network slice and an enhanced mobile broadband (eMBB) network slice.

6. The method of claim 1 wherein at least a subset of the respective data stores are in respective edge locations corresponding to the plurality of devices.

7. The method of claim 1 wherein the data comprises operational data of the plurality of devices.

8. The method of claim 1 further comprising aggregating at least some of the respective ones of the plurality of data portions from the respective data stores based at least in part on one or more common parameters of the one or more parameters.

9. The method of claim 8 further comprising enabling access by at least one user to the aggregated ones of the plurality of data portions from the respective data stores.

10. The method of claim 8 wherein the aggregating is performed in response to one or more queries for the data.

11. The method of claim 8 further comprising generating a visualization of the aggregated ones of the plurality of data portions, wherein the aggregated ones of the plurality of data portions are received from the respective data stores in a plurality of data streams.

12. The method of claim 1 further comprising:
assigning access to at least one user to at least some of the respective ones of the plurality of data portions from the respective data stores based at least in part on a role of the at least one user; and
aggregating the at least some of the respective ones of the plurality of data portions from the respective data stores based at least in part on the assigned access.

13. The method of claim 1 further comprising:
classifying the data into one or more functional groups; and
segregating the data into the plurality of data portions based at least in part on the one or more functional groups.

14. An apparatus comprising:
a processing device operatively coupled to a memory and configured:
to receive data from a plurality of devices;
to analyze the data to identify one or more parameters for segregation of the data;
to tag the data with one or more metadata tags corresponding to the one or more parameters;
to segregate the data into a plurality of data portions based at least in part on the one or more parameters; and
to store respective ones of the plurality of data portions in respective data stores of a plurality of data stores;
wherein the one or more parameters comprise at least one of one or more policies corresponding to the data and respective locations of the plurality of devices.

15. The apparatus of claim 14 wherein the processing device is further configured to map the plurality of data portions to one or more network slices of at least one of a fifth generation (5G) network and a private long-term evolution (pLTE) network based at least in part on the one or more policies.

16. The apparatus of claim 14 wherein the processing device is further configured to aggregate at least some of the respective ones of the plurality of data portions from the respective data stores based at least in part on one or more common parameters of the one or more parameters.

17. The apparatus of claim 14 wherein the processing device is further configured:
to assign access to at least one user to at least some of the respective ones of the plurality of data portions from the respective data stores based at least in part on a role of the at least one user; and
to aggregate the at least some of the respective ones of the plurality of data portions from the respective data stores based at least in part on the assigned access.

18. An article of manufacture comprising a non-transitory processor-readable storage medium having stored therein program code of one or more software programs, wherein the program code when executed by at least one processing device causes said at least one processing device to perform the steps of:
receiving data from a plurality of devices;
analyzing the data to identify one or more parameters for segregation of the data;
tagging the data with one or more metadata tags corresponding to the one or more parameters;
segregating the data into a plurality of data portions based at least in part on the one or more parameters; and
storing respective ones of the plurality of data portions in respective data stores of a plurality of data stores;
wherein the one or more parameters comprise at least one of one or more policies corresponding to the data and respective locations of the plurality of devices.

19. The article of manufacture of claim 18 wherein the program code further causes said at least one processing device to map the plurality of data portions to one or more network slices of at least one of a fifth generation (5G) network and a private long-term evolution (pLTE) network based at least in part on the one or more policies.

20. The article of manufacture of claim 18 wherein the program code further causes said at least one processing device to aggregate at least some of the respective ones of the plurality of data portions from the respective data stores based at least in part on one or more common parameters of the one or more parameters.

\* \* \* \* \*